May 29, 1934.  E. PAPPERT  1,960,451
OPTICAL MOUNTING
Original Filed Sept. 10, 1928
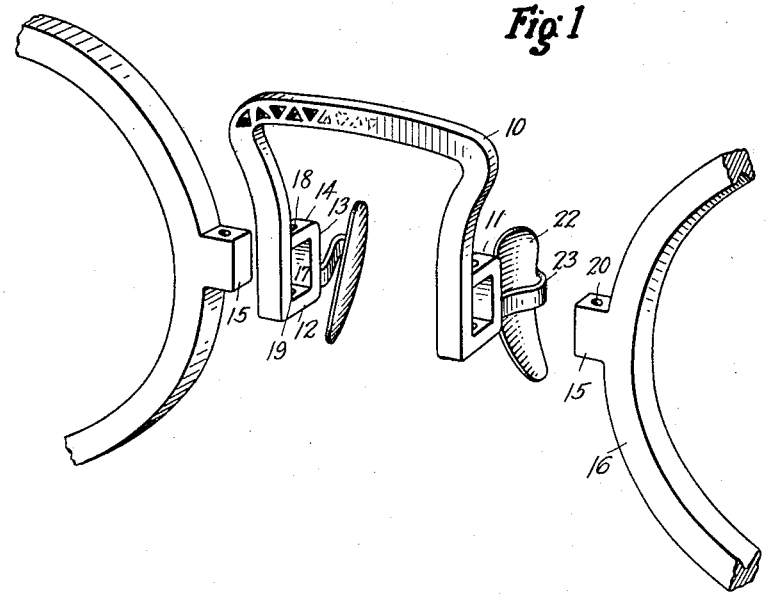
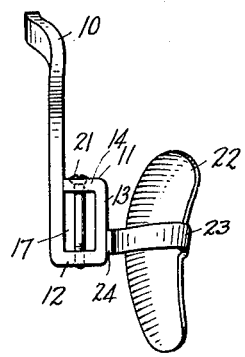
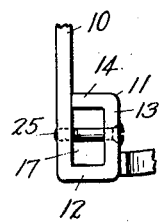
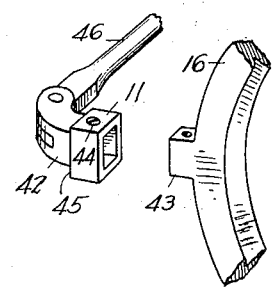
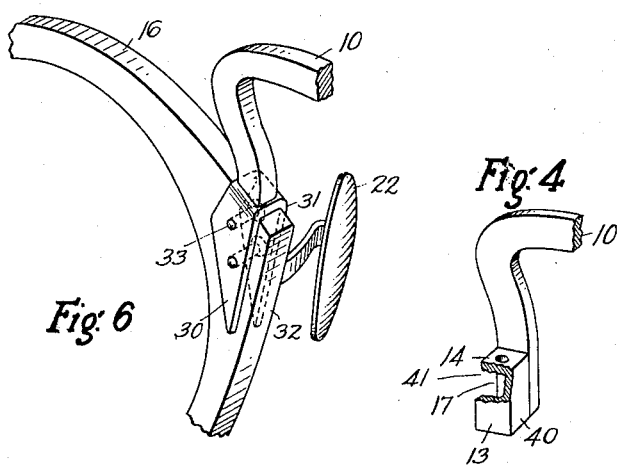
INVENTOR
Emanuel Pappert
BY
Harry Jacobson
ATTORNEY Patented May 29, 1934

1,960,451

UNITED STATES PATENT OFFICE 1,960,451

OPTICAL MOUNTING

Emanuel Pappert, Long Island City, N. Y., assignor to George P. Kimmel, Washington, D. C.

Application September 10, 1928, Serial No. 304,947
Renewed May 18, 1933

2 Claims. (Cl. 88—42)

This invention relates to optical mountings and particularly, to the means for securing a member such as a temple end piece or a bridge to a metallic or composition lens frame.

In composition lens frames, it has been customary in the past to secure a metal hinge part to the rear face of each of the composition endpieces on the frame and to secure a complementary hinge part on the inner face of each of the composition temples. In such instances it has obviously been impossible to utilize the metal portions of the endpieces for ornamental purposes, and the securing of the metal to the composition has likewise been such that it frequently pulled out or became loose. Attempts have been made to secure the temple connections as well as metal bridges to composition lens frames in various ways so as to utilize the metal parts for ornamental purposes and at the same time produce firm strong joints capable of withstanding the various stresses ordinarily placed upon them. These, however, have proven unsuccessful for the most part in either one respect or another.

The temple hinge members for composition lens frames, the temple end pieces of metallic frames, and metallic bridges and nose pads for either composition or metallic frames, have also heretofore customarily been permanently secured to the frame as by soldering, riveting or the like, whereby it becomes difficult, if not impossible, to separate or detach the parts from the lens frame without injury either to the parts or the frame. Since the ornamental appearance or design of spectacles is a determining factor in the sale thereof, it becomes highly advantageous for the seller to be able to change the ornamental parts of the spectacle to suit individual taste when occasion requires. It is also highly desirable to so connect the parts of the spectacle as to enable them to be readily detached and separated for repair or replacement.

My invention contemplates therefore the provision of metal endpiece and bridge members which will present visible ornamental parts which may themselves be ornamental by engraving or the like. It is an object that these parts may be so formed and disposed that they may be secured to the composition lens frame in a strong and durable manner without in any way detracting from their ornamental appearance.

My invention also contemplates the provision of an optical mounting for securing the bridge and temple end pieces to lens frames in such a manner that the spectacle may readily be separated into its component elements and readily re-assembled whereby it becomes possible to substitute or combine various styles of lens frames, bridges and temples to suit the purchaser, and to allow quick and easy replacement or repair of the parts.

The various objects of my invention will be clear from the description which follows and from the drawing in which, Fig. 1 is a perspective view of one form of my improved mounting as it appears applied to a bridge and nose pad.

Fig. 2 is a side view of the same.

Fig. 3 is a similar view of the same, showing the position of the removable securing means therefor.

Fig. 4 is a perspective view of a slightly modified form of the mounting wherein the embracing member is closed on all sides but one.

Fig. 5 is a similar view of my improved mounting as applied to a temple end piece, and Fig. 6 is a perspective view of a modified form of the mounting for the bridge.

In that practical embodiment of my invention which I have shown by way of example, particularly in Figs. 1 to 4 inclusive, as applied to a bridge, the bridge 10 is preferably made of a single piece of suitable material such as metal bent into the desired ornamental shape and terminating in suitable boxes, loops embracing or enclosing portions 11, open on at least one side and provided with an interior space into which a suitable lug 15 projecting from the lens frame may be inserted. The enclosing members 11 may take various forms as illustrated in Figs. 1, 4, 5 and 6. For instance, said members may be bent from the continued lower ends of the bridge, or may be stamped or bent from a separate piece or pieces of material and then secured to the bridge. It is immaterial whether the enclosing members are in the form of an open box (Fig. 4) and thereby conceal the inner ends of the lugs 15 as well as the other faces thereof, or whether said members are in the form of loops or U-shaped pieces.

I prefer, however, to arrange the enclosing members at the lower end of the bridge and to make said members of no greater width than that of the bridge, so that said members are not visible when the spectacles are in place on the wearer, being concealed from the front by the bridge.

Said bridge may be of uniform width throughout for economy and elegant appearance although the bridge may take any desired shape and may vary in width. As shown in Figs. 1 to 4, each of said enclosing portions may consist of a closed loop comprising a bottom or connecting web 12, a rear member 13 and a top 14, spaced and arranged for the reception of the suitably shaped lug 15 formed on the lens frame 16. By arranging the loop in substantial alignment with the bridge and directly behind the lower part of the bridge, it will be seen that the loop is concealed by the bridge when the spectacles of which it forms a part, are worn on the nose of the wearer. Said lug 15 projects preferably inwardly from the sides of the frame at about the middle thereof, and is arranged approximately symmetrically about a horizontal center line of the frame. Said lens frame may be of any desired shape or outline as is well understood in the art, and is preferably of annular form to allow the insertion of a suitable lens thereinto, being made of metal or composition as may be desired.

For convenience and economy in production, the lug 15 is preferably made integral with the lens frame and may be of any suitable configuration such as prismatic, cylindrical, or the like, the opening 17 of the enclosing member or loop 11 being also suitably shaped for the proper tight reception of said lug without relative movement therebetween after the parts have been assembled.

It will be seen that the bridge may be readily removably secured to the frame 16 by the insertion of the lug 15 into the opening 17 of the loop and the passage of a securing screw through the loop and through the lug 15. It will also be seen that the bridge may be quickly and easily removed by merely removing the screw.

When my invention has been applied to a number of differently shaped bridges, it will be understood that any bridge of the desired shape may be substituted for the bridge 10 provided that said bridge is provided with the enclosing member 11. It will also be seen that the bridge provided with my improved mounting may be readily removed for replacement and repair of the bridge or of the lens frames. The nose pad 22 is provided with a comparatively narrow curved extension 23 serving as a supporting means for the pad. The end 24 of the extension is suitably secured to the rear member 13 of the enclosing member 11 as by soldering or any other suitable means. It is customary to make the pad 22 and the extension 23 of a single piece of sheet material and to use the extension as an adjusting member for fitting the nose pad 22 to the nose of the wearer.

Referring now to Fig. 3, I have there shown the removable screw 25 arranged horizontally.

In Fig. 4, the enclosing member 40 is shown in the form of a box open at one end 41 through which the lug 15 may be passed into the interior space 17. Said member 40 may be stamped out of a single piece of material or it may be made of separate pieces bent into shape and soldered or otherwise secured to the bridge end. As has been explained, however, it is preferred that the width of the member 40 be not greater than that of the bridge for purposes of good appearance.

As shown in Fig. 5, my improved mounting may be used to secure a temple end piece 42 in place to the lens frame. In that case, the enclosing member 11, in the form of a loop or box as hereinbefore described, receives the lug 43 projecting outwardly from the lens frame, and is secured thereto by a removable screw arranged similarly to the screw 25. The end piece 42 may be soldered or otherwise secured to the outer face 45 of the enclosing member, and the temple 46 is hinged to the end piece in the usual manner.

Referring to Fig. 6, I have there shown the bridge 10 terminating in a front enclosing or embracing U-shaped member 30 and a similar rear member 31 joined by the top or web to which the lower end 35 of the bridge is soldered or otherwise secured. Said members 30 and 31 are passed about the projection 32 of the lens frame 16 and secured thereto preferably by means of a pair of spaced screws 33. This arrangement of the attaching means for the bridge forms an open loop, and is quite satisfactory for the purpose of allowing the removal of the bridge or frames. The pad 22 by means of the extension 23, is secured to the rear face of the rear member 31 in the manner which has been explained above in connection with the description of the modification shown in Figs. 1 to 3.

It will be seen that I have provided a simple and efficient mounting for removably securing a bridge and temple end pieces to the lens frames of a pair of spectacles, and that my improved mounting is designed for economical production and to meet the severe requirements of practical use. While I have shown and described a preferred embodiment of my invention, I do not intend to be understood as limiting myself to the specific structure shown and described but intend to claim my invention as broadly as may be permitted by the state of the prior art and the terms of the appended claims.

I claim:

1. In an optical mounting, a pair of non-metallic lens frames, each having a laterally extending integral portion on the nasal side thereof, each of said portions including a pair of edge parts and front and rear face parts, a metallic bridge including a top and a pair of inset sides, the lower end of each of said sides merging at its lower end into a coupling means including a pair of portions disposed at right angles to each other, one of the angled portions of each coupling means bearing against one of said edge parts and the other angled portion of each coupling means bearing against one of said face parts, and holdfast means for anchoring the coupling means and laterally extending portion together, the ends of said sides being integral with those angled portions of the coupling means which bear against said edge parts.

2. In an optical mounting, a pair of non-metallic lens rims, each having a laterally extending integral portion on the nasal side thereof, each of said portions including an upwardly facing edge part and front and rear face parts, a metallic bridge including a top and a pair of inset sides, each of said sides merging at its lower end into a coupling means including a pair of portions disposed at an angle to each other, one of the angled portions of each coupling means overlying said upwardly facing edge part, and the other angled portion of each coupling means bearing against and extending downwardly along one of said face parts, and holdfast means for anchoring said downwardly extending portion of the coupling means and said laterally extending portion of the rim together, the ends of said sides being integrally joined to those angled portions of the coupling means which overlie said upwardly facing edge parts.

EMANUEL PAPPERT.